(12) United States Patent
Clausen et al.

(10) Patent No.: US 6,996,598 B2
(45) Date of Patent: Feb. 7, 2006

(54) CALCULATION CIRCUIT FOR THE DIVISION OF A FIXED-POINT SIGNAL

(75) Inventors: Axel Clausen, Munich (DE); Mortitz Harteneck, Munich (DE)

(73) Assignee: Kimberly-Clark Worldwide, Inc., Neenah, WI (US)

(*) Notice: Subject to any disclaimer, the term of this patent is extended or adjusted under 35 U.S.C. 154(b) by 369 days.

(21) Appl. No.: 10/040,263

(22) Filed: Nov. 9, 2001

(65) Prior Publication Data

US 2002/0129076 A1 Sep. 12, 2002

(30) Foreign Application Priority Data

Nov. 10, 2000 (DE) ............................... 100 55 659

(51) Int. Cl.
*G06F 7/50* (2006.01)
(52) U.S. Cl. ...................................... 708/653; 708/655
(58) Field of Classification Search ................ 708/653, 708/655
See application file for complete search history.

(56) References Cited

U.S. PATENT DOCUMENTS

| 5,754,460 | A | * | 5/1998 | Tam | 708/653 |
| 5,903,485 | A | * | 5/1999 | Bennett | 708/653 |
| 5,903,486 | A | * | 5/1999 | Curtet | 708/655 |
| 5,946,223 | A | * | 8/1999 | Nakajima | 708/655 |
| 5,969,976 | A | * | 10/1999 | Kawasaki et al. | 708/655 |

FOREIGN PATENT DOCUMENTS

DE 690 30 772 T2 1/1998
DE 695 04 192 T2 12/1998

* cited by examiner

*Primary Examiner*—D. H. Malzahn
(74) *Attorney, Agent, or Firm*—Dority & Manning, P.A.

(57) ABSTRACT

A calculation circuit for the division of a fixed-point input signal comprising a sequence of digital data values having a width of n bits by an adjustable division factor $2^a$ for the purpose of generating a divided fixed-point output signal, having a signal input (2) for applying the data value sequence of the fixed-point input signal, a first addition circuit (6), which adds the digital data value present at the signal input (2) to a data value buffer-stored in a register (33) to form a digital first summation data value having a width of max (n, a+1)+1 bits, a shift circuit (11) which shifts the first summation data value present by a data bits toward the right, with the result that the max (n, a+1)−a+1 more significant data bits of the first summation data value are output at an output of the shift circuit (11), a logic circuit (16), which, as a function of the sign of the first summation data value, logically ANDs the a less significant data bits of the first summation data value with a logic combination data value, or logically Ors them with the inverted logical combination data value, and outputs them to the register (33) for buffer-storage of the logically combined data value ($d_{v1}$, $d_{v2}$), a second addition circuit (37), which, as a function of the sign of the first summation data value adds the data value output by the shift circuit (11) to a value one for eliminating the DC signal component to form a second summation data value, and having a signal output for outputting the sequence of the second summation data values as divided fixed-point output signal.

11 Claims, 2 Drawing Sheets

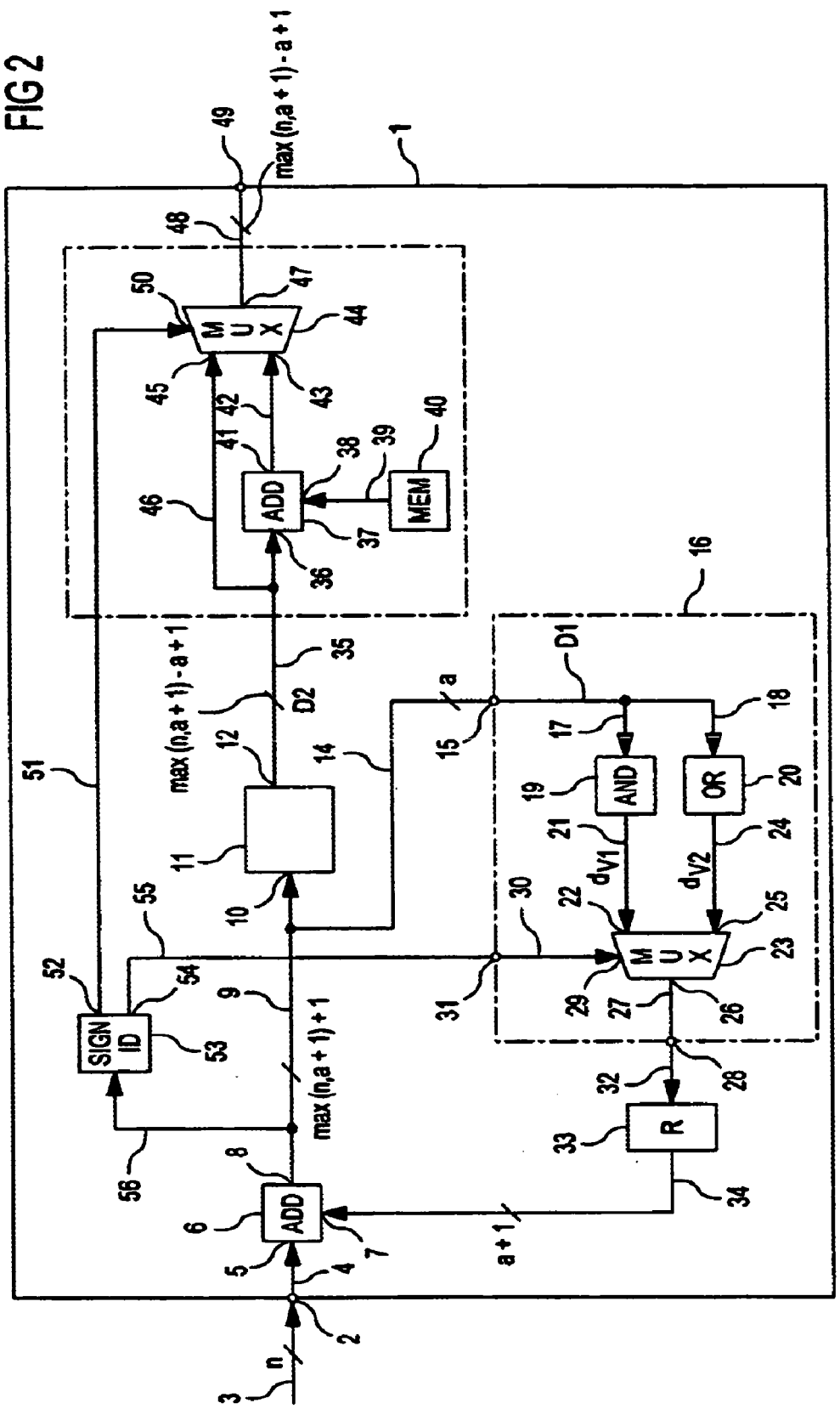

CALCULATION CIRCUIT FOR THE DIVISION OF A FIXED-POINT SIGNAL

CROSS-REFERENCE TO RELATED APPLICATION

This application claims priority to German Patent Application No. DE 100 55 659.0, filed on Nov. 10, 2000.

BACKGROUND

1. Technical Field

The invention generally relates generally to a calculation circuit and method for the division of a fixed-point input signal and, in particular, to a circuit and method for dividing a digital fixed-point input signal by an adjustable division factor $2^a$ for generating a divided fixed-point output signal that comprises minimal variance.

2. Discussion of Related Art

DE 690 30 772 T2 describes a divider for high-speed execution of an arithmetic operation. The divider serves for generating a quotient by dividing a dividend by a divisor. A first holding device contains the dividend data characterizing the dividend. A second holding device contains the divisor data characterizing the divisor. An operation device generates either a sum or a difference between the dividend data and the divisor data. The divider furthermore contains a third holding device which serves for holding sign bit data. An inverting device is provided for inverting the sign bit data. The divider furthermore contains a shift device for sequentially shifting the inverted sign bit data from a least significant bit position, if the inverted sign bit data are input from the inverting device, while the inverted sign bit data are held. A further shift device is provided for arithmetically shifting the result data generated by the operation device by one bit toward the left, while a logic ZERO is stored in an LSB position. A control device serves for controlling the execution of the iterative division processing through the control of the operation device and of the two shift devices, with the result that the operation device generates the sum or difference on the basis of the buffer-stored sign bit data. The second shift device doubles the operation result generated by the operation device, the first holding device buffer-storing the doubled result.

DE 695 04 192 T2 describes a circuit arrangement for the digital implementation of a division operation according to a method of ignoring intermediate remainders.

In many applications, it is necessary to divide a fixed-point signal comprising a sequence of digital data values having a width of n bits by a fixed division factor.

FIG. 1 shows a calculation circuit for the division of a fixed-point input signal present by an adjustable division factor for the purpose of generating a divided fixed-point output signal according to the prior art. The conventional fixed-point division circuit shown in FIG. 1 comprises a signal input E for applying the fixed-point input signal to be divided. In this case, the fixed-point input signal comprises a sequence of digital data values that have a width of n bits and are applied to the signal input E of the fixed-point division circuit via n data lines.

Via internal data lines of the fixed-point division circuit, the sequence of digital data values having a width of n bits passes to an addition circuit ADD, which adds the digital data value of the fixed-point input signal present to a data value buffer-stored in a register R. The register R is connected to the addition circuit ADD via a data lines for outputting a buffer-stored digital data value having a width of a bits. The addition circuit ADD adds the digital data value of the fixed-point input signal present to the data value having a width of a bits, said data value being buffer-stored in the register R, to form a summation data value having max (n,a)+1 data bits. The summation data value is output via data lines to a signal input of a split circuit SPLIT.

The split circuit splits the summation data value (which comprises a width of max(n,a)+1 bits) into a first data value, comprising the a less significant data bits of the summation data value, and into a second data value, comprising the more significant data bits of the summation data value. The first data value is output via max(n,a)−a+1 data lines at a signal output A of the fixed-point division circuit. The noise inflicted by the fixed-point division circuit can be filtered out by a downstream digital filter. The second data value is buffer-stored via a data lines in the register R and fed back to the addition circuit ADD.

The method of operation of the fixed-point division circuit of FIG. 1 will now be explained using an example. In this example, the fixed-point division circuit divides the fixed-point input signal present by a division factor 4, the number of fed-back less significant data bits of the second data value output by the split circuit being a=2. If a constant signal sequence comprising digital data values which have a width of 4 bits and have the value 3 (3=0011) in a constant manner is applied to the signal input E of the fixed-point division circuit, the following sequence of data values is produced in the case of the fixed-point division circuit according to the prior art as is illustrated in FIG. 1:

TABLE 1

| E | 3333 3333 . . . |
|---|---|
| R | 0321 0321 . . . |
| A | 0111 0111 . . . |

From the output data sequence A, the average value of the output signal is calculated in a downstream calculation circuit, said average value being 0.75 in the example illustrated. The constant input signal having the value 3 is divided by the division factor 4 by the fixed-point division circuit to form the value $\frac{3}{4}=0.75$.

The conventional fixed-point division circuit of FIG. 1 has a disadvantage, however, that in the case of an alternating input signal, the variance of the fixed-point output signal output by the fixed-point division circuit increases. By way of example, if an alternating signal sequence having alternate digital data values +3, −3 is applied to the signal input E of the fixed-point division circuit according to the prior art, the following data sequence is produced. The negative data values are represented as two's complement in a binary manner, i.e. the positive data value +3 corresponds to the binary value 0011 and the negative data value −3 corresponds to the binary coded data value 1101.

TABLE 2

| E | +3 −3 +3 −3 +3 −3 +3 −3 |
|---|---|
| R | 1 1 1 1 0 0 0 0 |
| A | +1 −1 +1 −1 +1 −1 +1 −1 |

As can be discerned, when an alternating input signal is present, the conventional fixed-point division circuit outputs an output signal that fluctuates back and forth between the digital value +1 and −1. Consequently, the variance of the output signal is not zero.

When a conventional fixed-point division circuit of this type is used in a feedback control loop, the value output by the fixed-point division circuit will fluctuate and thus reduce the stability of the closed-loop control.

SUMMARY OF THE INVENTION

It is an object of the present invention, therefore, to provide a calculation circuit and method for the division of a fixed-point input signal in which the resulting divided fixed-point output signal has a minimum variance.

The object is achieved by means of a calculation circuit according to one embodiment of the present invention for the division of a fixed-point input signal, which comprises a sequence of digital data values having a width of n bits, by an adjustable division factor 2a for the purpose of generating a divided fixed-point output signal, wherein the calculation circuit comprises:

a signal input for receiving a data value sequence of the fixed-point input signal;

a first addition circuit for adding the digital data value input at the signal input to a data value stored in a register to form a digital first summation data value comprising a width of max (n, a+1)+1 bits;

a shift circuit for shifting the first summation data value by a data bits towards the right to output the max (n, a+1)−a+1 more significant data bits of the first summation data value;

a logic circuit for logically ANDing the a less significant data bits of the first summation data value with a logic combination data value, or logically ORing the a less significant data bits of the first summation data value with an inverted logical combination data value, depending on a sign of the first summation data value, and for outputting a logically combined data value for storage in the register;

a second addition circuit for adding the data value output by the shift circuit to a value one for eliminating the DC signal component to form a second summation data value, depending on a sign of the first summation data value; and a signal output for outputting the sequence of the second summation data value as a divided fixed-point output signal.

The object is further achieved by means of a circuit according to another embodiment of the present invention, wherein the circuit comprises:

receiving means for receiving an n-bit fixed-point signal;

dividing means for dividing the n-bit fixed point signal by a division factor of $2^a$ for generating a divided fixed-point output signal; and control means for controlling the dividing means to adjust the division factor to decrease a variance of the divided fixed-point output signal.

The object is further achieved by means of a method for dividing a fixed-point input signal, which comprises a sequence of digital data values having a width of n bits, by an adjustable division factor $2^a$ for generating a divided fixed-point output signal, wherein the method comprises the steps of:

receiving a data value sequence of the fixed-point input signal;

adding the digital data value of the fixed-point input signal to a stored data value to form a digital first summation data value comprising a width of max (n, a+1)+1 bits;

shifting the first summation data value by a data bits towards the right to generate the max (n, a+1)−a+1 more significant data bits of the first summation data value;

logically ANDing the a less significant data bits of the first summation data value with a logic combination data value, or logically ORing the a less significant data bits of the first summation data value with an inverted logical combination data value, depending on a sign of the first summation data value, to generate a logically combined data value;

adding a value one to the shifted first summation data value for eliminating the DC signal component to form a second summation data value, depending on a sign of the first summation data value; and outputting the sequence of the second summation data value as a divided fixed-point output signal.

These and other objects, features and advantages of the present invention will be described or become apparent from the following detailed description of preferred embodiments, which is to be read in connection with the accompanying drawings.

BRIEF DESCRIPTION OF THE FIGURES

FIG. 2 illustrates a calculation circuit according to an embodiment of the present invention.

DETAILED DESCRIPTION OF PREFERRED EMBODIMENTS

Figure 1:
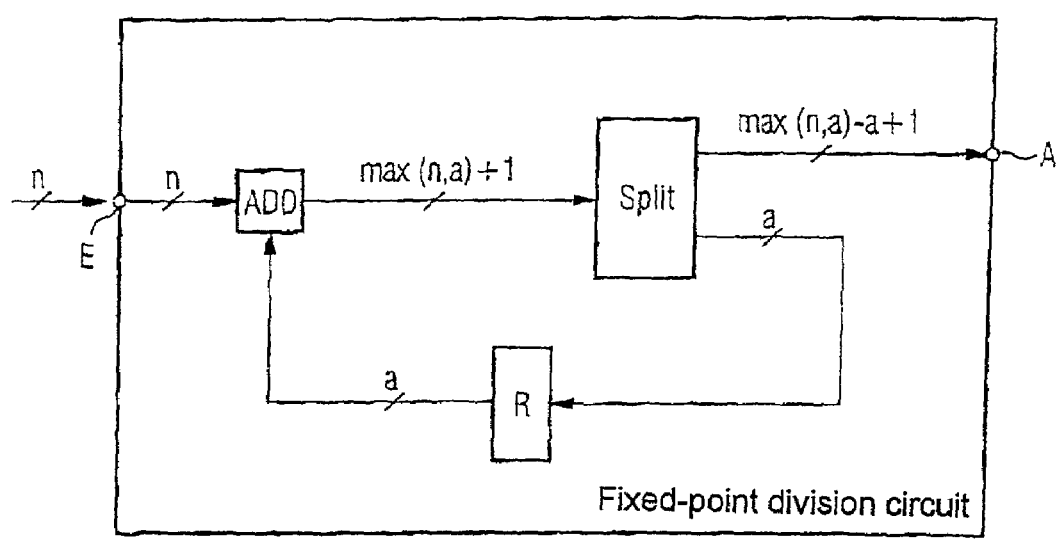
FIG. 1 illustrates a conventional fixed-point division circuit.

As can be discerned from FIG. 2, a calculation circuit 1 according to an embodiment of the present invention comprises a signal input 2 for applying a fixed-point input signal. The fixed-point input signal comprises a sequence of digital data values that have a width of n bits and are fed via n data lines 3 to the digital data input 2 of the calculation circuit 1 according to the invention. The signal input 2 is connected via data lines 4 to a first data input 5 of an adder 6. The adder 6 comprises a second data input 7 and adds the digital values present at the two data inputs 5,7 to form a first digital summation data value having a width of max (n, a+1)+1 bits. The first digital summation data value formed by the addition circuit 6 is output from an output 8 of the addition circuit 6 via data lines 9 to a digital data input 10 of a shift circuit 11. The shift circuit 11 comprises a signal output 12. The shift circuit 11 shifts the first summation data value present at the data input 10 by a data bits toward the right, with the result that the less significant data bits are output and the max (n, a+1)−a+1 more significant data bits of the summation data value are output at the output 12 of the shift circuit 11.

The a less significant data bits of the first summation data value are applied to a signal input 15 of a logic circuit 16 via a data lines 14. In the logic circuit 16, the a less significant data bits of the summation data value generated by the adder 6 are applied via lines 17, 18 to a first logic circuit 19 and to a second logic circuit 20. The first logic circuit 19 logically ANDs the fed-back data value D1 present with a stored logic combination data value and outputs the logically combined data value via data lines 21 to a first input 22 of a multiplexer 23. The second logic circuit 20 logically Ors the fed-back data value D1 having a width of a bits with the inverted logic combination data value and outputs the logically combined data value via lines 24 to a second input 25 of the multiplexer 23. The multiplexer 23 comprises a signal output 26, which is connected via a line 27 to an output 28 of the logic circuit 16. The multiplexer 23 further comprises a control input 29, which is connected via a line 30 to a control input 31 of the logic circuit 16.

The output 28 of the logic circuit 16 is connected via data lines 32 to a register 33, which buffer-stores the digital data value output by the multiplexer 23. On the output side, the register 33 is connected by a+1 data lines 34 to the second input 7 of the addition circuit 6.

The output 12 of the shift circuit 11 outputs, via max (n, a+1)−a+1 data lines 35, the more significant data bits of the summation data value generated by the adder 6 to a signal input 36 of a further adder 37. The adder 37 comprises a second signal input 38, which receives a digital data value 1 from a memory device 40 via data lines 39. The adder 37 comprises a signal output 41, which is connected via data lines 42 to a signal input 43 of a multiplexer 44. The multiplexer 44 comprises a further signal input 45, which is directly connected to the signal output 12 of the shift circuit 11 via (n+1) lines 46. The multiplexer 44 comprises a signal output 47 that is connected via data lines 48 to a signal output 49 of the calculation circuit 1. The multiplexer 44 furthermore comprises a control input 50, which is connected via a control line 51 to an output 52 of a sign identification circuit 53. The sign identification circuit 53 comprises a further output 54, which is connected via a control line 55 to the control input 31 of the logic circuit 16. The sign identification circuit 53 receives, via data lines 56, the summation data value formed by the first addition circuit 6 and identifies the sign of said summation data value. The sign identification circuit 53 drives the two multiplexers 44, 23 via the control lines 51, 55.

If the sign identification circuit 53 identifies that the digital summation data value comprises a positive sign or is zero, the signal input 22 of the multiplexer 23 is switched through to the signal output 26 of the multiplexer 23, with the result that the data value formed by the first logic circuit 19 is written to the register 33 and buffer-stored.

On the other hand, if the sign identification circuit 53 identifies that the digital summation data value formed by the addition circuit 6 comprises a negative sign, then it drives the multiplexer 23 via the control line 55 in such a way that the signal input 25 of the multiplexer is switched through to the signal output 26 of the multiplexer 23. In this case, the data value formed by the second logic circuit 20 is written to the register 33 and buffer-stored.

If the sign identification circuit 53 identifies that the first summation data value formed by the addition circuit 6 comprises a positive sign or is zero, the multiplexer 44 is furthermore driven via the control line 51 in such a way that the signal input 45 of the multiplexer is switched through to the signal output 47 of the multiplexer. In this way, the more significant data bits output by the shift circuit 11 via the output 12 are switched through directly to the signal output 49 of the calculation circuit 1.

On the other hand, if the sign identification circuit 53 identifies that the sign of the first digital summation data value formed by the addition circuit 6 is negative, the other signal input 43 of the multiplexer 44 is switched through to the signal output 47, with the result that the summation data value formed by the addition circuit 37 is present at the signal output 49 of the calculation circuit 1. This summation data value is the sum of the second data value and a data value 1 added thereto.

The calculation circuit 1 according to the invention carries out division of the fixed-point signal present at the signal input 2 by a division factor $2^a$. The division factor is a power value with base 2 and exponent a. The exponent a corresponds to the number of data bits which are shifted toward the right by the shift circuit 11. The logic combination data value with which the logic circuits 19, 20 logically combine the fed-back first data value is equal to the division factor reduced by a data value 1.

Consequently, the logically combined data value $d_v$ output by the logic circuit 19 turns out to be:

$$d_{v1}=D_1 \text{ AND } (2^a-1) \tag{1}$$

The logically combined data value output by the logic circuit 20 is:

$$d_{v2}=D_1 \text{ or } [\text{NOT } (2^a-1)] \tag{2}$$

where $D_1$ is the digital data value comprising the less significant data bits of the first summation data value.

The calculation circuit 1 as shown in FIG. 2 yields, for a fixed-point input signal sequence which also contains negative digital data values, a divided fixed-point output signal having a low variance, as shown by the following example.

Assuming a fixed-point input signal sequence of digital data values, which alternatively carry +3, −3, is applied to the signal input 2 of the calculation circuit 1, the data sequences specified below in Table 3 are produced in the register 33 and at the output 49 of the calculation circuit 1:

TABLE 3

| | |
|---|---|
| E | +3 −3 +3 −3 +3 −3 +3 −3 |
| R | −3 0 −3 0 −3 0 −3 0 |
| A | 0 0 0 0 0 0 0 0 |

As can be discerned from a comparison of Tables 2 and Table 3, both the fixed-point division circuit according to the prior art, as is illustrated in FIG. 1, and the calculation circuit 1 according to an embodiment of the invention, as is illustrated in FIG. 2, yield an output signal having the average value 0. In the case of the conventional fixed-point division circuit, however, the output signal fluctuates between the value +1 and −1, while in the case of the calculation circuit 1, according to the invention, the output settles to a fixed value. If the calculation circuit 1 according to the invention, as is illustrated in FIG. 2, is used in a control loop for dividing a fed-back, fixed-point signal, the stability of the control loop is higher than when a conventional fixed-point division circuit, as is illustrated in FIG. 1, is used, on account of the low variance of the output signal by the calculation circuit 1.

A calculation circuit according to the invention may advantageously be implemented, for example, in QAM demodulators. DC-value-free and low-noise estimated values for trigger frequencies, clock rates and phase angles are calculated in this case. The calculation circuit 1 according to the invention reduces the variance of the output signal and thus the signal noise.

Various areas of use of noise shapers or of the calculation circuit 1 according to the invention are presented in "A Minimal Multi-bit Digital Noise Shaping Architecture" in IEEE, 1996, page 5 to page 7.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A calculation circuit for the division of a fixed-point input signal, which comprises a sequence of digital data values having a width of n bits, by an adjustable division factor $2^a$ for generating a divided fixed-point output signal, the circuit comprising:

a signal input for receiving a data value sequence of the fixed-point input signal;

a first addition circuit for adding the digital data value input at the signal input to a data value stored in a register to form a digital first summation data value comprising a width of max (n, a+1)+1 bits;

a shift circuit for shifting the first summation data value by a data bits towards the right to output the max (n, a+1)−a+1 more significant data bits of the first summation data value;

a logic circuit having an AND gate configured to logically AND the a less significant data bits of the first summation data value with a logic combination data value to generate a first logically combined data value ($d_{v1}$) and having an OR gate configured to logically OR the a less significant data bits of the first summation data value with an inverted logical combination data value to generate a second logically combined data value ($d_{v2}$) wherein depending on a sign of the first summation data value the first logically combined data value ($d_{v1}$) or the second logically combined data value ($d_{v2}$) is output for storage in the register;

a second addition circuit configured to provide as an output the data value output by the shift circuit added to a value one for eliminating the DC signal component to form a second summation data value, depending on a sign of the first summation data value; and a signal output for outputting the sequence of the second addition circuit output as a divided fixed-point output signal.

2. The calculation circuit of claim 1 further comprising a sign identification circuit for identifying a sign of the first summation data value.

3. The calculation circuit of claim 2, wherein the second addition circuit comprises:

an adder for adding the data value output by the shift circuit to the value one to form the second summation data value; and a multiplexer, which, as a function of a control signal received from the sign identification circuit, switches through the data value or the second summation data value, generated by the adder, to the signal output of the calculation circuit.

4. The calculation circuit of claim 3, wherein when a positive sign of the first summation data value is identified by the sign identification circuit, the multiplexer of the second addition circuit switches through the data value output by the shift circuit to the signal output of the calculation circuit, and when a negative sign of the first summation data value is identified by the sign identification circuit, the multiplexer of the second addition circuit switches through the second summation data value output by the adder to the signal output of the calculation circuit.

5. The calculation circuit of claim 2, wherein the logic circuit comprises a multiplexer, the multiplexer comprising:

a first input, which is connected to the output of the AND gate, a second input, which is connected to the output of the OR gate, an output, which is connected to the register, and a control input, which is driven by a sign identification circuit.

6. The calculation circuit of claim 1, wherein the logic combination data value is equal to the division factor reduced by the value one.

7. The calculation circuit of claim 6, wherein the division factor is a power value with a base 2 and an exponent a.

8. The calculation circuit of claim 7, wherein the exponent a corresponds to the number of data bits shifted toward the right by the shift circuit.

9. The calculation circuit of claim 1, wherein the logic circuit comprises an inverter for inverting the logic combination date value.

10. The calculation circuit of claim 1, wherein when a positive sign of the first summation data value is identified by a sign identification circuit, a multiplexer of the logic circuit switches through the output of the AND gate to the register, and when a negative sign of the first summation data value is identified by the sign identification circuit, the multiplexer of the logic circuit switches through the output of an OR gate to the register.

11. A method for dividing a fixed-point input signal, which comprises a sequence of digital data values having a width of n bits, by an adjustable division factor $2^a$ for generating a divided fixed-point output signal, the method comprising the steps of:

receiving a data value sequence of the fixed-point input signal;

adding the digital data value of the fixed-point input signal to a data value stored in a register to form a digital first summation data value comprising a width of max (n, a+1)+1 bits;

shifting the first summation data value by a data bits towards the right to generate the max (n, a+I)−a+1 more significant data bits of the first summation data value;

logically ANDing the a less significant data bits of the first summation data value with a logic combination data value using an AND gate to generate a first logically combined data value ($d_{v1}$), or logically ORing the a less significant data bits of the first summation data value with an inverted logical combination data value using and OR gate to generate a second logically combined data value ($d_{v2}$), wherein depending on a sign of the first summation data value, the first log first logically combined data value ($d_{v1}$) or the second logically combined data value ($d_{v2}$) is output for storage in the register;

adding a value one to the shifted first summation data value for eliminating the DC signal component to form a second summation data value, depending on a sign of the first summation data value; and outputting the sequence of the second summation data value as a divided fixed-point output signal.

* * * * *